Dec. 8, 1936.   J. W. HOBBS   2,063,379
OVERRUNNING CLUTCH AND CONTROL MEANS THEREFOR
Filed March 27, 1931   3 Sheets-Sheet 1
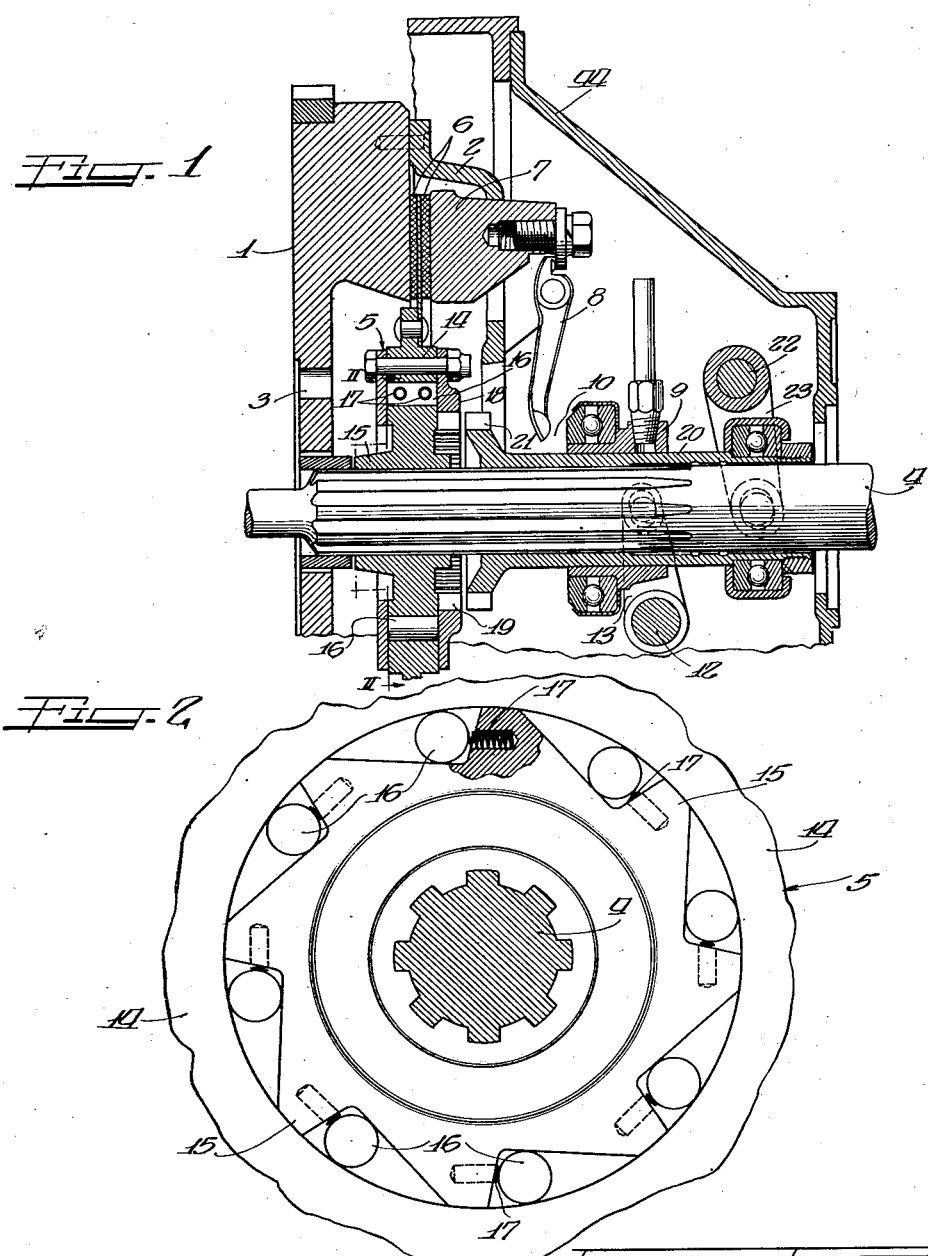
Inventor:
John W. Hobbs.

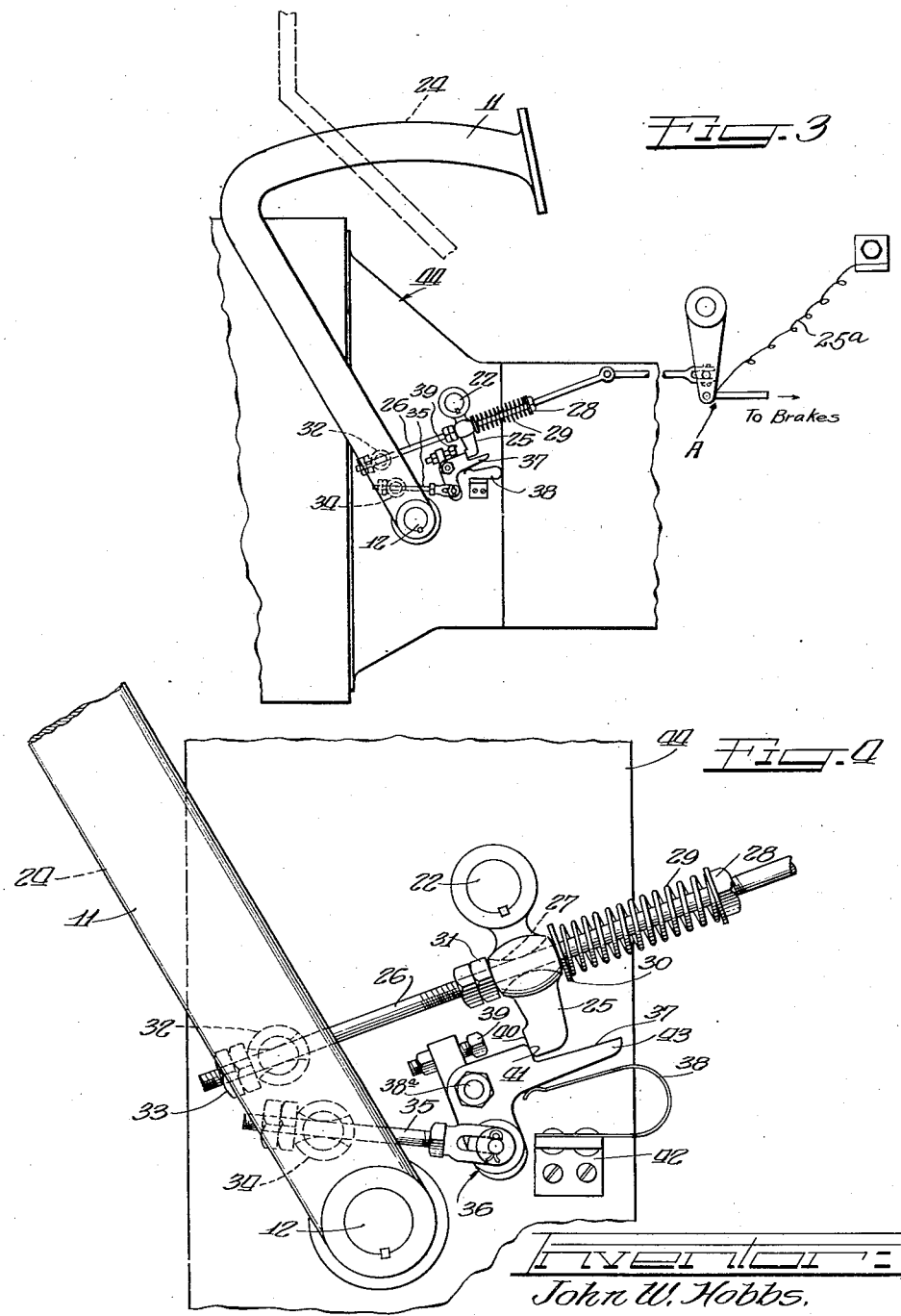

Dec. 8, 1936. J. W. HOBBS 2,063,379
OVERRUNNING CLUTCH AND CONTROL MEANS THEREFOR
Filed March 27, 1931 3 Sheets-Sheet 3
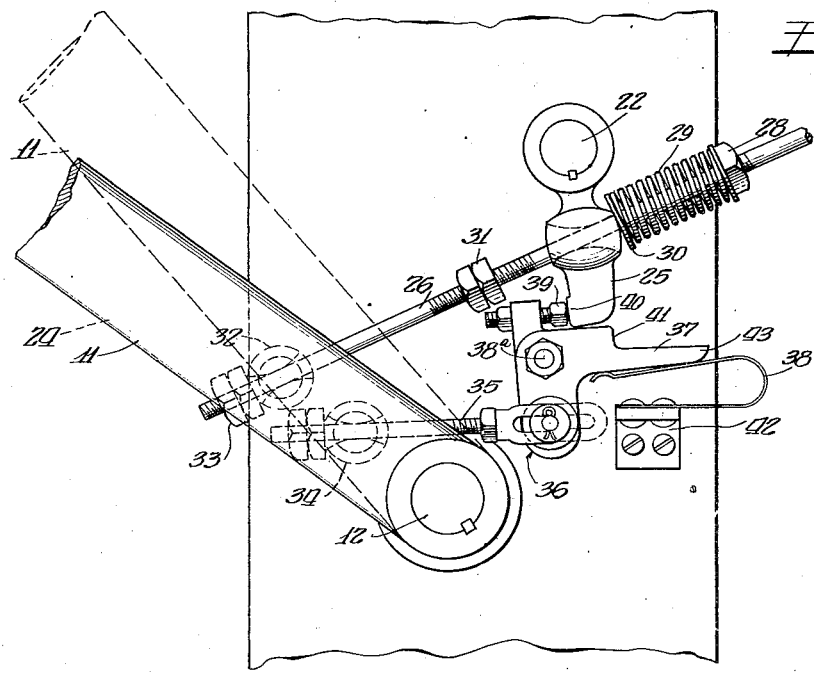
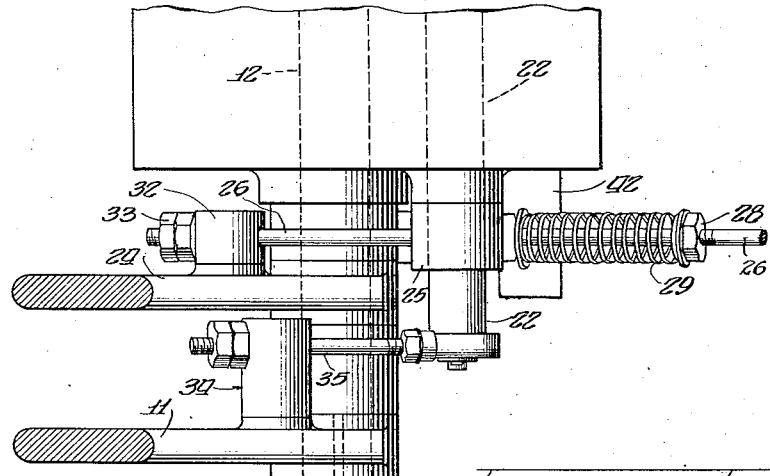
Inventor:
John W. Hobbs.
by Charles T. Hill Attys.

Patented Dec. 8, 1936

2,063,379

UNITED STATES PATENT OFFICE 2,063,379

OVERRUNNING CLUTCH AND CONTROL MEANS THEREFOR

John W. Hobbs, Chicago, Ill., assignor, by mesne assignments, to Borg-Warner Corporation, Chicago, Ill., a corporation of Illinois Application March 27, 1931, Serial No. 525,737

14 Claims. (Cl. 192—13)

This invention relates to motor vehicle transmissions, and has generally to do with an overrunning drive and lock-out mechanism therefor.

In constructions of this character heretofore in vogue, that is, employing mechanism permitting the vehicle to proceed by virtue of its own momentum independently of the engine, so that the latter will not be run unnecessarily and will not act as a brake, means have been provided for locking-out the overrunning elements so that the engine will act as a brake when desired. As heretofore employed, such means, while performing a desirable function, have been in one manner or other unsatisfactory.

The reason for the dissatisfaction growing out of the use of the present type of lock-out mechanism resides in the fact that such mechanism is operated by means of an extra lever placed within reach of the driver. It will be appreciated that when it is the desire of the driver to bring the car to a stop, or at least to employ the engine as a brake to substantially slow down the car, which desire manifests itself particularly in case of an emergency, the driver has all he can do to properly steer the car with his hands without subjecting himself to extra effort to lock-out the overrunning mechanism. In the case of present structures having this function, a lever is provided and the operator must move into an unnatural position to lock-out the overrunning device, and this is dangerous as well as annoying since it occurs at a time when all his attention should be focussed on the road and the proper driving and steering of the car. In addition to the annoyance resulting from his necessarily assuming an awkward position with constructions heretofore in use, it often proves to be quite dangerous.

It is accordingly one of the objects of the present invention to provide a device for rendering the overrunning instrumentalities of a motor vehicle inoperative without necessitating the use of either hand of the operator.

A further object of the invention is to provide a lock-out mechanism of this character which does not require for its operation an abnormal action of the driver.

Another object of the invention resides in the provision of means operable in response to a normal act of the driver to render the overrunning instrumentalities ineffective.

A further object of the invention consists in the provision of a means for locking-out or rendering ineffective the overrunning mechanism of a vehicle, in consequence of a normal vehicle retarding act of the driver.

Another object resides in the provision of means operable in response to movement of the clutch and brake pedals of a motor vehicle to render the overrunning instrumentalities thereof ineffective.

Another object of the invention is to provide means for rendering the overrunning instrumentalities of a motor vehicle ineffective without appreciable shock to the parts.

It is another object of the invention to provide spring means pressing spaced portions of each roller of an overrunning clutch to preclude tilting of the rollers and insure their proper engagement with the overrunning parts.

Further objects and advantages of the present invention will appear as the description proceeds.

In carrying out the invention, I avail myself of any suitable drive element such as a flywheel and associated back and pressure plate construction for cooperation with the engine clutch facings. The clutch is of a special character embodying overrunning parts, one of the parts being splined to the usual driven element such as a splined shaft, and the other part having locking teeth. A sleeve on the shaft is operable by the clutch pedal for disengaging the clutch. A second sleeve is mounted for movement on the spline shaft in response to movement of the brake pedal. This second sleeve is provided with teeth adapted to interlock with the toothed part of the clutch to thereby lock the overrunning parts against relative movement so that the engine will act as a brake. Suitable mechanism is provided in connection with the brake and clutch pedals and is of such construction that it will permit the brake pedal to actuate the usual wheel brake means of the vehicle, but will not permit locking of the overrunning parts unless the clutch pedal has first been depressed a certain amount. Thus, when the driver desires to momentarily reduce the velocity of the vehicle, that is, when he desires to make use of the wheel brakes only, he may simply depress the brake lever and the desired result will be accomplished. However, when he desires the use of the engine to brake or retard the car, he will depress both the clutch pedal and the brake pedal, whereupon the teeth on the second sleeve will engage the teeth on the clutch and thereby establish a direct two-way connection between the drive and driven shafts of the vehicle. If necessary, the engine clutch may be disengaged to avoid clashing of the teeth.

It will thus be apparent that the hands of the driver are not necessary to the actuation of the mechanism herein set forth, so that he is not subject to the annoyance caused by being required to assume an awkward position, as in the case of hand lever controlled lock-out devices heretofore in vogue, and in addition it will be noted that it is necessary that the operator perform a normal act in order to take advantage of the engine as a braking means.

On the drawings:

Figure 1 is a fragmentary sectional view showing an embodiment of the invention.

Figure 2 is a view of the overrunning construction taken approximately in the plane indicated by the line II—II in Figure 1, slightly broken away to show a detail.

Figure 3 is a fragmentary side elevation showing the special mechanism by means of which the overrunning parts are locked, the parts being arranged in inoperative position.

Figure 4 is an enlarged fragmentary side elevation of the mechanism shown in Figure 3.

Figure 5 is a view similar to Figure 4, but showing the operating parts in their relative positions when the overrunning device is locked-out.

Figure 6 is a fragmentary plan view of the parts as they appear in Figure 4.

Referring now more particularly to the drawings, wherein the same parts are indicated by the same reference characters, a flywheel 1 is provided with a back plate 2 secured thereto in any suitable manner, and with openings 3 for the reception of bolts to secure a crank shaft (not shown) thereto. A splined shaft 4 having an end rotatable within the flywheel 1 carries a clutch 5 provided with facings 6 which are yieldably maintained in driving contact with the co-operating surfaces of the flywheel 1 and the pressure plate 7 by spring means not shown. Pressure plate retracting levers 8, one of which appears in the drawings, are actuated by a slidable sleeve 9, play being provided at 10 between the sleeve 9 and the levers 8. The clutch retracting sleeve 9 is actuated in the usual manner in response to depression of the clutch pedal 11 mounted on and causing rotation of the stud 12, the latter being provided with a lever 13 connected with the sleeve 9.

In accordance with the present invention, instead of making the clutch 5 a rigid member, as in prior constructions, the same is made of a plurality of parts, the outer of which, indicated at 14, carries the clutch facings. The inner part or hub 15 is splined on the spline shaft 4, which is a driven shaft, and spring pressed rollers 16 carried in converging grooves provided by the parts 14 and 15 provide an overrunning drive between these parts. In order to insure proper gripping of the rollers 16, each is urged toward the small part of its recess by a pair of springs 17, one adjacent each end of the roller. The two springs hold the rollers in alignment and obviate tilting thereof which has heretofore caused faulty operation where only a single spring was employed. Bearing in mind that the arrangement shown in Figure 2 is taken approximately in the plane of the line II—II of Figure 1, it will be clear that the hub 15 is capable of movement relative to the outer part 14 so that a motor vehicle embodying this construction may proceed without the engine acting as a brake, when the speed of rotation of the driven shaft exceeds that of the engine or crank shaft and flywheel.

It will be understood that at times it is desirable to use the engine for the purpose of braking the vehicle, and to this end the outer part 14 of the clutch 5 carries a ring 18 provided with a series of internal teeth 19. Splined on the shaft 4 is a sleeve 20 disposed preferably within the sleeve 9 and provided with external teeth 21 adapted for interlocking engagement with the teeth 19 carried by the part 14. The sleeve 20 is operably connected to a stud 22 through the medium of a lever 23, said stud being adapted to be actuated in response to depression of the brake pedal 24 in a manner to appear hereinafter. Thus when the sleeve 20 is actuated in a direction toward the clutch 5, the teeth 19 and 21 will interlock to thereby set up a direct two-way drive between the flywheel 1 and the driven shaft 4, so that the engine, being connected to the flywheel 1, will serve as a brake for the vehicle when the speed of the driven shaft 4 tends to exceed that of the flywheel.

In accordance with the present invention, unique instrumentalities are provided for the purpose of permitting the use of the foot brake to resist movement of the vehicle when it is not desired to employ the engine as a brake, yet being so operable as to bring the engine into use as a brake when such use of the engine becomes desirable. To this end, the stud 22 is extended through the casing 44 and carries for movement therewith a lever 25. A rod 26 passes through the lever 25 and has universal movement with respect to the lever as indicated at 27. The rear end of the rod 26 carries an abutment 28, and a spring 29 is held between the lever 25 and the abutment 28. If desired, a washer 30 may be arranged between the spring 29 and the lever 25. An abutment 31 is also provided on the rod 26 but on the other side of the lever 25 and is connected to the rod in order to limit movement of the latter rearwardly with respect to the lever 25. The forward end of the rod 26 is joined to the brake pedal 24 by a swivel connection 32, in order that the rod 26 may be drawn forward in response to depression of the brake lever 24. A further abutment 33 is adjustable on the end of the rod 26 and is resiliently maintained in engagement with the swivel connection 32 by the usual brake pullback spring means, such as the spring 25a acting on the brake linkage, a part of which is shown at A. It is noted that the various abutments are adjustable to vary the pressure of the spring 29 and the distances between the abutments.

The clutch pedal 11 has swiveled thereto at 34 a second rod 35 having a lost motion pivotal connection at 36 with a bell crank catch lever 37. A spring 38 constantly urges the lever 37 to move in a counter-clockwise direction as viewed in Figures 3, 4 and 5. The lever 37 is pivotally carried by a stud 38a and is provided with an adjustable stop 39 adapted to cooperate with the portion 40 of the lever 25 to limit movement of the latter.

The rod 26 is connected in any suitable manner, such as shown in Figure 1, to the wheel brake operating means, a part of which appears at A. It will be noted that this rod is movable forward in response to any depression of the brake lever 24 to thereby actuate the wheel brakes (not shown) and that said brakes are returned to released positions by means comprising the spring 25a, which also returns the rod 26 and lever 25 upon release of the brake pedal 24.

The operation of my construction is as follows: Assume the various parts to be arranged as shown in Figure 1, and that the vehicle is coasting, the spline shaft 4 rotating at a greater speed than the flywheel 1 so that the hub 15 overruns or moves relative to the outer part 14 of the clutch 5, and that the driver desires to apply only the foot brake. Directing our attention particularly to Figure 4, it will be seen that forward movement of the brake pedal will result in movement of the rod 26 and hence operation of the wheel brakes, while corresponding movement of the lever 25 is prevented by the shoulder 41 on the lever 37, the brake lever being suitably connected with the wheel brake instrumentalities of the vehicle to operate the same.

Should the operator desire to connect the engine to the driven shaft in such a manner that the overrunning parts will be locked, so that the engine will act as a brake, it is necessary, in addition to depressing the brake lever 24, to also depress the clutch pedal 11 sufficiently to bring the shoulder 41 of the lever 37 below the lower portion 40 of the lever 25 so that the spring 29 can force the lever 25 forward. When this is done, the stud 22 is caused to rotate, whereupon, as seen in Figure 1, the sleeve 20 will be urged forward by the lever 23 with the result that the teeth 21 will interlock with the teeth 19. Once the lever 25 is permitted to move forward beyond the shoulder 41, the driver releases pressure on the clutch pedal and the latter will be brought by the usual spring (not shown) to its normal position as seen in Figures 1 and 2 and in dotted lines in Figure 5. Then, as long as the foot brake pedal is held in a depressed position, the engine will serve as a brake to reduce the speed of the vehicle when the driven shaft 4 tends to move at a greater speed than the flywheel 1.

Figures 1 and 2 show the clutch and brake pedals in their normal positions, and Figure 5 shows, in full lines, the arrangement of the parts when both pedals are depressed as mentioned. It will be noted that the play 10 between the sleeve 9 and the levers 8 is of such extent that the sleeve 9 will not depress the levers 8 during the slight depressing movement of the clutch pedal necessary to release the lever 25. Inasmuch as the sleeve 9 is movable independently of the sleeve 20, it will be seen that the act of disengaging the clutch may be performed in the usual way. It will be noted, however, that the block 42 carrying the spring 38 is located a sufficient distance from the arm 43 of the lever 37 to permit the arm 43 to be swung in a clockwise direction to a sufficient extent to permit complete depression of the clutch lever 11 when it is desired to disengage the clutch.

The engine clutch pedal 11 is operative in the usual way to effect disengagement of the engine clutch. It will be observed that this operation may take place regardless of the position of the overrunning clutch lockout lever 25, since the latter will not interfere with the consequent clockwise turning of the bellcrank lever 37. Since the wheel brakes will be in released condition when it is desired to reengage the engine clutch, the usual wheel brake spring means (not shown) acting through the rod 26 as pointed out above will hold the lever 25 in retracted position as shown in Figures 3 and 4, where said lever will not interfere with the return movement of the bellcrank lever 37 under the influence of the spring 38. The nuts 31 may be shifted toward the nut 28 to vary the clearance between the shoulders 40 and 41.

It will be appreciated from the foregoing that with this invention the wheel brake and engine clutch may be controlled independently of each other as in a conventional car, that energy for locking out the overrunning clutch is stored up by virtue of the application of the brakes, and that this energy may be released by movement of the clutch pedal without necessitating disengagement of the engine clutch although the latter may be effected to avoid clashing of the lockout teeth.

It will be apparent that the construction is extremely simple, involving few parts, which parts are however easily accessible for adjustment or repairs since they are disposed for the most part entirely outside of the casing 44.

I am aware that many changes may be made and numerous details of construction may be varied through a wide range without departing from the principles of this invention, and I, therefore, do not purpose limiting the patent granted hereon otherwise than necessitated by the prior art.

I claim as follows:

1. A motor vehicle having clutch and brake members, a driving element, a driven element, an overrunning connection between said elements, means operable by said brake member for preventing overrunning of said connection, and means controlled by the clutch member to prevent locking-out of said connection when said brake member is operated.

2. A motor vehicle having clutch and brake pedals, a drive element, a driven element, overrunning parts connecting said elements, means including a lost motion connection associated with said clutch pedal so that the latter may be depressed to a certain extent without disengaging the clutch, means associated with said brake pedal for locking said overrunning parts, and including a lost motion connection cooperating with the first lost motion connection, and means controlled by said clutch pedal to resist operation of said locking means.

3. A motor vehicle including a brake pedal, a clutch having overrunning parts, a clutch pedal, a rod connected to said brake pedal, a lever movably connected to said rod, means limiting relative movement of said lever and rod, a spring urging said lever toward said means, a catch to prevent movement of said lever when said brake pedal is depressed, whereby the brake is operable independently of said lever, said catch being controlled by said clutch pedal so as to be retracted thereby and permit movement of said lever, said catch being retained in retracted position by said lever when the brake pedal is depressed, so that pressure on said clutch pedal may be released, and instrumentalities controlled by said lever to lock said overrunning parts against relative movement.

4. A motor vehicle including a brake pedal, a clutch having overrunning parts, a clutch pedal, a rod connected to said brake pedal, a lever movably connected to said rod, means limiting relative movement of said lever and rod, a spring urging said lever toward said means, a catch to prevent movement of said lever when said brake pedal is depressed, whereby the brake is operable independently of said lever, said catch being controlled by said clutch pedal so as to be retracted thereby and permit movement of said lever, said catch being retained in retracted position by said lever when the brake pedal is depressed, so that pressure on said clutch pedal may be released, instrumentalities controlled by said lever to lock said overrunning parts against relative movement, a driven element carrying said clutch, a slidable sleeve about said element and operatively associated with said clutch pedal for disengaging said clutch, said instrumentalities including a second slidable sleeve about said element, and interlockable means on said clutch and second sleeve.

5. A motor vehicle including a brake pedal, a clutch having overrunning parts, a clutch pedal, a rod connected to said brake pedal, a lever movably connected to said rod, means limiting relative movement of said lever and rod, a spring urging said lever toward said means, a catch to prevent movement of said lever when said brake pedal is depressed, whereby the brake is operable independently of said lever, said catch being controlled by said clutch pedal so as to be retracted thereby and permit movement of said lever, said catch being retained in retracted position by said lever when the brake pedal is depressed, so that pressure on said clutch pedal may be released, instrumentalities controlled by said lever to lock said overrunning parts against relative movement, a driven element carrying said clutch, said instrumentalities including a slidable sleeve about said element, and interlockable means on said clutch and sleeve.

6. In a motor vehicle, a driving element, a driven element, an overrunning clutch connecting said elements, means for establishing a two-way drive between said elements, means for storing up energy to operate the first means, and a device for releasing said energy.

7. In a motor vehicle having a brake, driving and driven elements, an overrunning clutch connecting said elements, means for interlocking said elements to establish a two-way drive therebetween, means for applying the brake and at the same time storing up energy for operating the interlocking means, and means for releasing said energy.

8. In a motor vehicle having a brake, driving and driven elements, an overrunning connection therebetween, means for applying the brake and simultaneously establishing a two-way drive between said elements, and means for preventing establishment of said two-way drive without interfering with the application of said brake.

9. A motor vehicle having means accessible to the driver for controlling the transmission of power and for braking the vehicle, a drive element of said vehicle, a driven element, an over-running connecton between said elements, and instrumentalities independent of said connection and operable in response to the combined actuation of said controlling and braking means by the driver for preventing over-running of said connection.

10. A motor vehicle having means accessible to the driver for controlling the application of power and for braking the vehicle, driving and driven elements of said vehicle, a one-way clutch interposed between said elements, means for converting said one-way clutch into a two-way drive, and means for operating said last mentioned means in response to the combined actuation of said controlling and braking means by the operator.

11. A motor vehicle including a drive element, a driven element, overrunning parts connecting said elements, means for locking said parts against overrunning, spring means for actuating and facilitating operation of said locking means, a driver-controlled device for energizing said spring means, and means arranged to optionally prevent actuation of said locking means when said spring means is energized.

12. A motor vehicle including a drive element, a driven element, overrunning parts connecting said elements, means for locking said parts against overrunning, spring means for actuating and facilitating operation of said locking means, a driver-controlled device for energizing said spring means, and means arranged to optionally prevent actuation of said locking means when said spring means is energized, said vehicle having a clutch pedal operatively connected with the last mentioned means for retracting the same to permit actuation of said locking means.

13. A motor vehicle including a drive element, a driven element, a clutch including overrunning parts connecting said elements, clutch disengaging means, means for locking said overrunning parts together, brake operating means controlling said locking means, and means for preventing actuation of the locking means before the clutch disengaging means is actuated.

14. In a motor vehicle having a driving element and a driven element, mechanism comprising, a manually operable brake control member for said vehicle, a second manually operable control member for said vehicle, an overrunning clutch connecting said driving element with said driven element, a positive jaw clutch adapted when rendered effective to lock out said overrunning clutch, means through which said positive clutch may be rendered effective upon manual operation of said brake member in a direction to apply the vehicle brakes, and other means associated with said first named means and with said second control member so arranged as to compel operation of said second control member prior to the operation of said positive jaw clutch to lock out said overrunning clutch in response to manual operation of the brake control member as aforesaid.

JOHN W. HOBBS.